G. B. EWART AND H. R. MILLIGAN.
SIGNAL FOR MOTOR VEHICLES.
APPLICATION FILED MAR. 20, 1919.
1,403,150.
Patented Jan. 10, 1922.
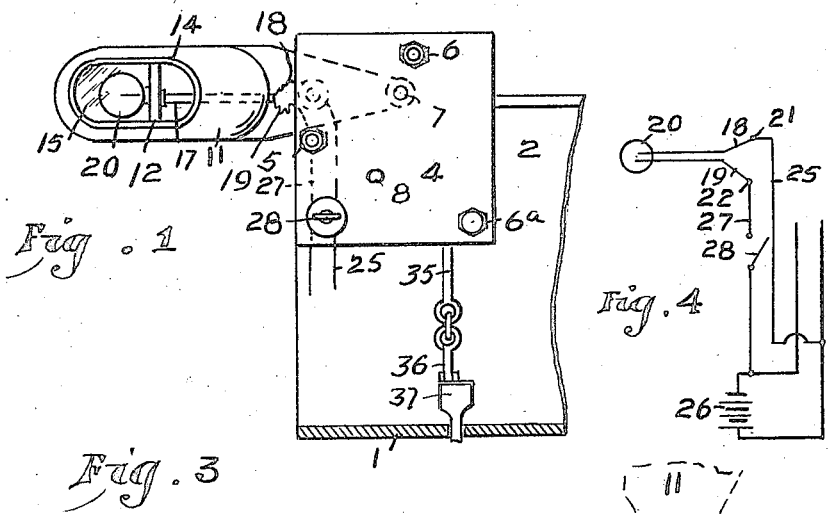
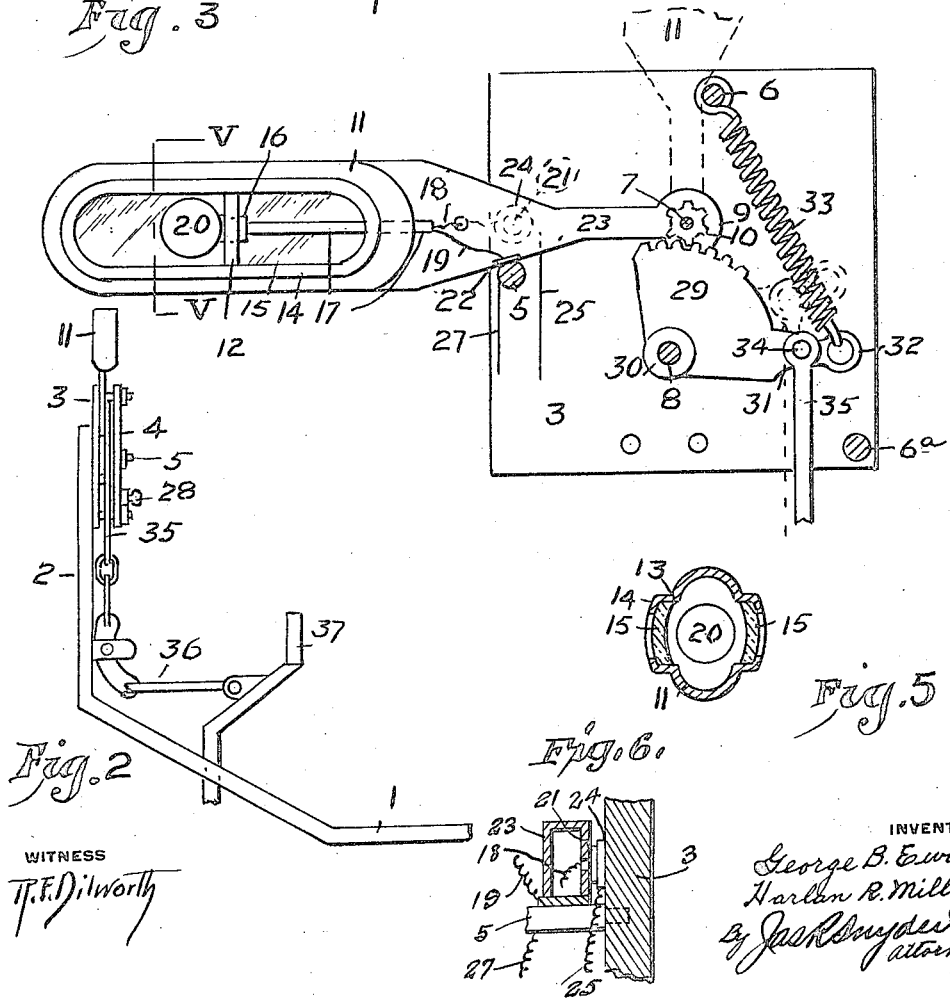

UNITED STATES PATENT OFFICE.

GEORGE B. EWART AND HARLAN R. MILLIGAN, OF PITTSBURGH, PENNSYLVANIA.

SIGNAL FOR MOTOR VEHICLES.

1,403,150.   Specification of Letters Patent.   Patented Jan. 10, 1922.

Application filed March 20, 1919. Serial No. 283,818.

*To all whom it may concern:*

Be it known that we, GEORGE B. EWART and HARLAN R. MILLIGAN, citizens of the United States of America, residing at Pittsburgh, county of Allegheny, and State of Pennsylvania, have invented certain new and useful Improvements in Signals for Motor Vehicles, of which the following is a specification.

This invention relates to signals for motor vehicles and has for its object to provide means, in a manner as hereinafter set forth, carried by a vehicle for signalling to a vehicle approaching from the rear to indicate the direction which the forward vehicle will turn to prevent possibility of collision, and further to overcome the present practice of a chauffeur extending one of his arms outwardly and laterally with respect to the vehicle body to signal for the purpose set forth, thereby permitting the chauffeur the use of both of his hands for controlling the car.

Further objects of the invention are to provide a signal for the purpose set forth capable of being employed during the day and night to perform its function, strong, durable, efficient and convenient in its use, readily set up with respect to the vehicle body, and comparatively inexpensive to manufacture.

With the foregoing and other objects in view the invention consists of the novel construction, combination and arrangement of parts, as hereinafter more specifically described and illustrated in the accompanying drawings wherein is shown an embodiment of the invention, but it is to be understood that changes, variations and modifications can be resorted to which come within the scope of the claim hereunto appended.

In the drawings wherein like reference characters denote corresponding parts throughout the several views:

Figure 1 is a rear elevation of the signal showing it connected to the front of the vehicle body.

Figure 2 is an enlarged sectional elevation.

Figure 3 is a front view in section of the signal with the signal arm in operative position.

Figure 4 is a diagram illustrating the circuit arrangement for the lamp of the signal arm.

Figure 5 is a section on line V—V, Figure 3.

Figure 6 is a sectional detail.

Referring to the drawings in detail 1 denotes a motor vehicle body provided with a dash board 2 which has suitably connected therewith a support for the signal arm shifting mechanism.

The support consists of a pair of spaced plates 3, 4, connected together by tie-bars 5, 6 and 6ª. Carried by the plates 3, 4, is a pair of shafts 7, 8, the former has mounted thereon the collar 9 formed on the inner end of a signal arm or blade to be presently referred to. One side of the collar 9 has formed integral therewith a pinion 10 of less diameter than the collar.

The signal arm comprises a hollow body portion 11 substantially of oval shape in cross section and having a transverse bar 12 secured therein. Each side of the body portion 11 is formed with a lengthwise opening 13, with the edge thereof surrounded by an L-shaped flange 14, which provides a retainer for a transparent panel 15, of any suitable color, preferably red.

Carried by the bar 12 is a lamp socket 16, from which extends rearwardly a tube 17, for the leading-in-wires 18, 19 of an incandescent lamp 20 which is mounted in the socket 16. The wire 18 is connected to a contact 21, secured in one side of the body portion 11 at the inner end thereof. The wire 19 is connected to a contact 22 secured in the lower edge of the body portion 11 at its inner end.

The body portion 11 terminates in a narrow extension 23 which carries on its inner end the collar 9.

Mounted in the plate 3 is a contact 24 which associates with the contact 21 and to which is connected a circuit wire 25 leading from an electrical source 26. The tie-bar 5, constitutes a contact and associates with the contact 22. Leading to the tie-bar 5, from the source 26, is a circuit wire 27, in which is interposed a switch 28. The tie-bar 5 also constitutes a means for limiting the shifting movement of the signal arm in one direction.

Loosely mounted on the shaft 8 is a spring controlled toothed quadrant 29 which permanently meshes with the pinion 10, and when actuated in one direction lowers the signal arm and in the other direction elevates it. The quadrant at one corner has a hub or collar 30 through which extends the shaft 8, and at its opposite corner has a lateral lug 31, provided at its free end with an eye 32.

Attached at its upper end to the tie-bar 6 is coiled retractile spring 33. The lower end of the spring 33 is attached to the eye 32 and the function of such spring is to maintain the signal arm in vertical or normal position, and to shift said arm upwardly from signalling position to normal. The upward movement of the signal arm is arrested by the tie-bar 6.

Pivotally connected to the lug 31, as at 34, is a depending shifting bar 35, for the quadrant 29. The lower end of the bar 35, is attached to a lever operating mechanism 36, therefor. Said mechanism is connected with a foot lever 37 of the motor vehicle, preferably the brake lever.

The normal position of the signal arm and toothed quadrant is that as indicated in dotted lines in Fig. 3.

When the signal is employed in the daytime the lamp 20 is cut out from the source 26, by the switch 28. When used at night the switch is closed and when the signal arm is shifted so that the contact 21 engages with contact 28, and contact 22 engages tie-bar 5 the lamp 20 will be illuminated.

The quadrant 29 is actuated in one direction, against the action of spring 33, by the application of pressure on the foot lever 37, which will lower the signal arm to signaling position, which position is lateral with respect to the body of the vehicle. When pressure is relieved on the lever 37, the spring 33, will act to restore the signal arm and quadrant to normal position.

What we claim is:

A signal for the purpose set forth comprising a pair of spaced plates connected together by tie-bars, one of said tie-bars constituting a lower contact and connected with an electrical source, said lower contact forming a stop, an upper contact mounted in one of said plates and connected with an electrical source, an arm pivotally supported between the plates and provided with an electric lamp, a contact on the lower edge of the arm adapted to engage said lower contact, a contact on the side of the arm adapted to engage said upper contact, and means for shifting said arm to bring the contacts into engagement to illuminate the lamp, said lower contact limiting the downward movement of the arm.

In testimony whereof we affix our signatures in the presence of two witnesses.

GEORGE B. EWART.
HARLAN R. MILLIGAN.

Witnesses:
R. CLEMENT WEBER,
K. B. MAXWELL.